Patented Oct. 20, 1936

2,058,031

UNITED STATES PATENT OFFICE 2,058,031

PROVISION OF ARTICLES WITH SURFACE FINISHES

Edward Arthur Murphy, Wylde Green, Birmingham, England, assignor to Dunlop Rubber Company, Limited, Birmingham, England, a British corporation No Drawing. Application February 17, 1934, Serial No. 711,736. In Great Britain February 20, 1933

10 Claims. (Cl. 91—68)

This invention concerns improvements in or relating to the provision of articles with surface finishes and, more particularly, to providing articles made of rubber or containing rubber or similar material and herein designated as rubber articles.

The main object of the present invention is to impart to surfaces of rubber articles surfaces such for example as a smooth matt finish or a suede surface finish.

According to the present invention, the method of providing articles with surface finishes comprises coating or treating surfaces of articles with flocculent rubber precipitates derived from aqueous emulsions or dispersions of rubber or the like of the kinds hereinafter specified, and then contacting as by dusting the still set surfaces with a powder such as starch powder or finely divided material such as finely divided cotton or wool.

A type of smooth finish which can be produced according to the present invention is similar to that imparted according to usual practice to the rubber surface of proofed fabrics. It is customary to produce this smooth finish by treating a tacky rubber surface with starch powder, and subsequently anchoring the starch powder to the surface by treatment with sulphur chloride in vapor or solution form.

It has been found that such matt surfaces have an absence of drag and prevent "spotting". By spotting is meant the markings produced on a rubber surface after having been in contact with water.

The present invention permits this type of smooth matt finish to be obtained with greater ease. The rubber precipitates can be applied, for example, to a rubber or fabric material surface either by brushing, spreading or spraying. Powders such as those of starch or finely divided materials such as those of cotton or waste wool are preferably dusted on the layer of rubber precipitate.

It has been found that after subsequent drying no further treatment is usually necessary. The application of the rubber precipitates followed by the application of a powder or finely divided material can also, if desired, be applied to the rubber surface of a dipped article such as a rubber glove in order to facilitate the operations of putting it on and taking it off the hand.

The flocculent precipitates of rubber can be conditioned by the addition of wetting agents such as castor oil soap and alcohol in order to facilitate the initial wetting of the rubber surface.

The flocculent precipitates employed have adhesive properties superior to those of a latex preparation of similar composition. Also heavily compounded compositions containing flocculent precipitates of rubber can be produced containing practically no water soluble ingredients such as protective colloids.

It has been known for some time that instead of the usual adherent coagulum it is possible to obtain rubber as a flocculent precipitate from latex by the use of certain coagulents and by adjustment of the concentration of the latex, as for instance, "Estate Rubber" O. deVries, page 143 of 1920.

The aforesaid flocculent precipitates can be prepared from rubber latex in controllable manner by the use of varied coagulating agents and methods of coagulation provided that the coagulation is effected in the presence of a relatively large quantity of water and with or without the presence of certain amounts of alkaline or colloidal substances found to have a restraining effect upon the coagulation.

Examples of suitable coagulents are insoluble metallic salts produced in situ such as magnesium silicate, aluminum silicate.

Examples of substances having a restraining effect on the coagulation are caustic potash, casein, sodium aluminate, glue and gum acacia. The amount of such substances used also influences the degree of subdivision of the granular dispersion.

The degree of concentration has also an influence on the fineness of the precipitate. In general the lower the concentration the finer the initial precipitate.

The aqueous dispersions aforesaid are preferably employed at such dilutions that 100 ccs. thereof contain not more than 10 grams of total solids.

By the suitable choice of reagents and conditions of working flocculent dispersions of varying consistency can be formed.

If desired, the flocculent precipitates can be washed free from soluble products such as soluble sulphates or chlorides by known means as for instance by decantation or filtration and washing prior to their compacting.

Preferably for carrying the present invention into effect the flocculent precipitates are filtered, in this way removing a large proportion of the water content. The filtering means employed may be, for example, of ceramic material, cotton fabric, or fine mesh wire gauze. If desired, suction may be employed to aid the filtration. The resulting paste-like product is then applied to the surface to be treated as hereinbefore described.

The emulsions or dispersions of rubber or the like comprise those consisting of rubber, gutta-percha, balata or similar vegetable resins occurring naturally or artificially obtained. Such artificial aqueous dispersions may include those of coagulated rubber, vulcanized rubber, synthetic rubber, waste or reclaim.

If desired, any of the aforementioned dispersions may be used alone or in admixture with one another.

Any of the aforesaid dispersions may contain the usual known compounding and vulcanizing ingredients and/or may be in the first instance in concentrated form.

Concentrates such as are obtained in Patent No. 1,846,164, or in British Patent 219,635 to which may be added any one or more of the usual known compounding ingredients may also be employed subsequent to dilution.

The aforesaid vulcanization and/or compounding ingredients which are added in the form of their dispersions may be added to the aforesaid aqueous emulsions or dispersions of rubber or the like prior or subsequent to the precipitation of the granular or flocculent coagula.

The following examples illustrate how the method of the present invention can be effected.

*Example 1*

A rubber or fabric to be provided with a smooth matt finish is first coated with a rubber precipitate of composition:

| | Parts by weight |
|---|---|
| Rubber | 60 |
| Aluminum silicate | 40 | prepared by diluting 100 parts of 60% rubber latex produced by centrifugalization to 5% concentration and then stirring in first a 5% solution containing 120 parts of commercial sodium silicate (approximately 50% concentration) and then a 5% solution containing 96 parts of aluminum sulphate crystals.

Before application the resulting precipitate is allowed to drain on a filter cloth for several hours until a thick creamy consistency is obtained, containing 15 to 16% total solids.

This is applied as a thin coating to the surface by painting, spraying or spreading and the still wet layer is then dusted over with farina powder. It has been found that the adherent properties of the rubber precipitate when dry are sufficient to anchor the farina securely to the surface without need of subsequent treatment, such for example as cold cure vulcanization.

*Example 2*

To produce on a rubber or fabric surface a felt-like or suede-like appearance, the rubber or fabric surface is first treated with a rubber precipitate, as for instance according to Example 1, and while the layer of rubber precipitate is still in the wet condition finely divided cotton or waste wool is dusted on, and the product subsequently dried.

Having now particularly described my invention, I claim:

1. A process of providing articles with surface finishes which comprises treating an aqueous dispersion of rubber material of a solid content not over 10%, first with a reagent having no coagulating effect on said dispersion, then with a second reagent that forms with said first reagent a solid water insoluble inorganic compound while coagulating the dispersed material of said dispersion to form a highly hydrated finely divided suspended coagulum, concentrating said suspension to paste form, spreading it on the surface to be finished, and dusting thereon a finely divided finishing material.

2. The process of claim 1 in which said finishing material is in the form of fibrous flocs.

3. The process of claim 1 in which said finishing material is a powder.

4. The process of claim 1 in which the first reagent is an alkali silicate and the second reagent is an aluminum salt.

5. The process of claim 1 in which the first reagent is sodium silicate and the second reagent is aluminum sulphate and in which the resulting concentrated coagulum paste has a concentration of about 15 to 16% total solids.

6. A method of providing articles with surface finishes which comprises treating an aqueous dispersion of rubber material of a solid content not over about 10% with a coagulant under such conditions as to form a finely divided suspended coagulum containing a large quantity of water, concentrating said suspension by filtration to paste form, spreading it on a surface to be finished, and dusting thereon a finely divided finishing material.

7. A process of providing articles with surface finishes which comprises treating an aqueous dispersion of rubber material of a solid content not over about 10% to form a heavily compounded flocculent finely divided coagulum containing a highly hydrated insoluble silicate, applying the wet coagulum thus obtained to a rubber surface to be finished, and dusting thereon a finely divided material.

8. The process of claim 7 in which the quantity of silicate in said coagulum is of a magnitude approaching that of the rubber content.

9. The process of claim 1 in which said coagulum is conditioned by a wetting agent to cause it to wet and adhere to the surface on which it is applied.

10. The method of claim 1 in which said coagulum is free of water soluble salts.

EDWARD ARTHUR MURPHY.